(12) United States Patent
Law

(10) Patent No.: US 12,360,770 B2
(45) Date of Patent: Jul. 15, 2025

(54) SYSTEM AND METHOD FOR PROVIDING LOCK-FREE SELF-SERVICE QUEUE

(71) Applicant: JPMorgan Chase Bank, N.A., New York, NY (US)

(72) Inventor: Theodore C Law, Ridgewood, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/123,599

(22) Filed: Mar. 20, 2023

(65) Prior Publication Data

US 2024/0320006 A1 Sep. 26, 2024

(51) Int. Cl.
*G06F 9/38* (2018.01)
*G06F 9/52* (2006.01)

(52) U.S. Cl.
CPC .............. *G06F 9/3814* (2013.01); *G06F 9/52* (2013.01)

(58) Field of Classification Search
CPC ................................. G06F 9/3814; G06F 9/52
See application file for complete search history.

(56) References Cited

U.S. PATENT DOCUMENTS

| | | | | |
|---|---|---|---|---|
| 7,308,448 B1 * | 12/2007 | Martin | ....................... | G06F 9/52 |
| 7,533,138 B1 * | 5/2009 | Martin | ..................... | G06F 9/466 |
| 8,938,598 B2 * | 1/2015 | Jones | ....................... | G06F 12/02 |
| | | | | 711/170 |
| 2007/0169123 A1 * | 7/2007 | Hopkins | .................. | G06F 9/524 |
| | | | | 718/100 |
| 2012/0278811 A1 * | 11/2012 | Baynast | ................. | G06F 9/5027 |
| | | | | 718/104 |
| 2013/0042001 A1 * | 2/2013 | Gould | ..................... | G06F 9/542 |
| | | | | 709/224 |
| 2015/0026412 A1 * | 1/2015 | Eads | ................... | G06F 16/9574 |
| | | | | 711/135 |
| 2018/0088947 A1 * | 3/2018 | Landheer | .................. | G06F 5/00 |

(Continued)

FOREIGN PATENT DOCUMENTS

WO WO-2018046084 A1 * 3/2018

OTHER PUBLICATIONS

Michael et al., "Simple, Fast, and Practical Non-Blocking and Blocking Concurrent Queue Algorithms", ACM, 1996, pp. 267-275.*

(Continued)

*Primary Examiner* — David J. Huisman
(74) *Attorney, Agent, or Firm* — GREENBLUM AND BERNSTEIN, P.L.C.

(57) ABSTRACT

A method and system for providing a lock-free self-service queue. The method includes enqueuing at least one node in the queue; competing, by producer threads, to append their respective nodes to a last node of the queue; allowing only one producer thread to append its respective node to the last node of the queue, in which unsuccessful producer threads either give up or reattempt to append their nodes to the appended node; and allowing at least one of the producer threads to temporarily operate as a consumer thread to process the first non-deleted node, and then logically delete at least one non-mark-deleted node among the nodes, in which the at least one consumer thread and others of the producer threads are concurrently executed; and modifying the next node pointer field of the last node of the enqueued at least one node to include an address of the appended node.

19 Claims, 12 Drawing Sheets

(56) References Cited

U.S. PATENT DOCUMENTS

2018/0300933 A1* 10/2018 Burke .................. G06T 15/005
2022/0374270 A1* 11/2022 Zonca .................. G06F 3/0671

OTHER PUBLICATIONS

Shann et al., "A practical nonblocking queue algorithm using compare-and-swap", IEEE, 2000, pp. 470-475.*
Sundell et al., "Fast and Lock-Free Concurrent Priority Queues for Multi-Thread Systems", IEEE, 2003, 11 pages.*
Stone, "A simple and correct shared-queue algorithm using compare-and-swap", Supercomputing '90: Proceedings of the 1990 ACM/IEEE Conference on Supercomputing, 1990, pp. 495-504.*
Harris, "A Pragmatic Implementation of Non-blocking Linked-Lists", DISC '01: Proceedings of the 15th International Conference on Distributed Computing, Oct. 3, 2001, pp. 300-314.*

* cited by examiner

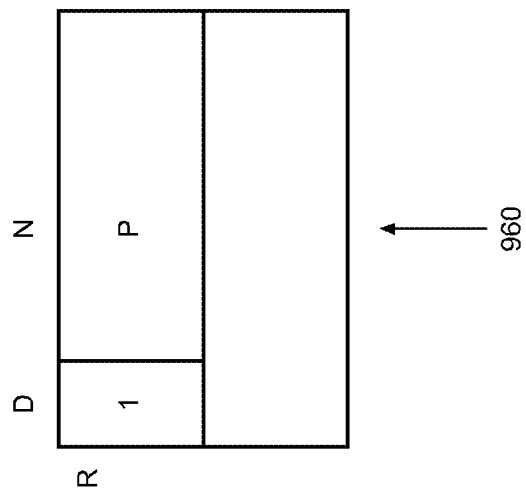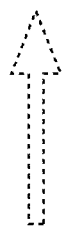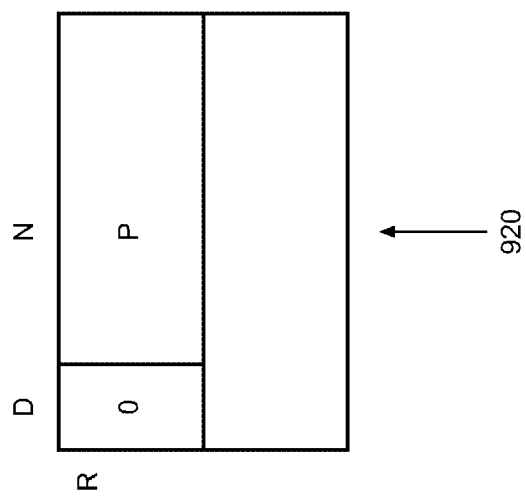
FIG. 9B

SYSTEM AND METHOD FOR PROVIDING LOCK-FREE SELF-SERVICE QUEUE

TECHNICAL FIELD

This disclosure generally relates to a system and method for providing a lock-free implementation of a self-service queue.

BACKGROUND

A producer-consumer queue is a conventional data structure used in concurrent programming. With a producer-consumer queue, there are typically one or multiple producer threads enqueueing items into the queue, and a single, separate and dedicated, consumer thread dequeuing data items from the queue. When no data items are in the queue, the dedicated consumer thread will either poll continually for the next item, or be blocked until the next item is available. The data items are enqueued and then dequeued and executed in a first-in-first-out (FIFO) order. In a lock-based implementation, any producer or consumer will acquire a lock whenever it needs to enqueue or dequeue an item. This lock will prevent all other threads from progressing. In other words, a producer thread may block the consumer thread that is attempting to execute a deque operation or the consumer thread may block an enqueue operation by the producer thread, even though they are working on two different ends of the queue. Such a result provides for delayed or slower processing of data in the producer-consumer queue, in which one of the consumer thread or producer thread is required to remain blocked until the corresponding enqueue/dequeue operation by the other thread is completed. More specifically, when the consumer thread attempts to dequeue from the beginning of the producer-consumer queue in FIFO order, it may block other producer threads from enqueueing to the end of the queue, and vice-versa. This is unnecessary because the two operations are working on different ends of the queue.

SUMMARY

According to an aspect of the present disclosure, a method for providing a lock-free self-service queue is disclosed. The method includes performing, using a processor and a memory: enqueuing at least one node in the lock-free self-service queue, in which the plurality of nodes are linked, in which at least one of the plurality of nodes is configured to hold a data item or remain empty, and in which each of the plurality of nodes includes at least a next node pointer field, a delete flag indicator field and a data item field; competing, by a plurality of producer threads, to append their respective nodes to a last node of the enqueued at least one node; allowing only one of the plurality of producer threads to append its respective node to the last node of the enqueued at least one node, in which unsuccessful producer threads either gives up or reattempt to append their nodes to a new last node of the queue; allowing at least one of the plurality of producer threads to temporarily operate as a consumer thread to process the first item in the queue, and then logically delete it after it has been processed. This temporary consumer thread may execute concurrently with the plurality of producer threads, which compete to modify the next node pointer field of the last node of the enqueued at least one node to include an address of an appended node.

According to another aspect of the present disclosure, the at least one enqueued node included in the lock-free self-service queue comprises one or more mark-deleted nodes, and in which each of the marked-deleted nodes no longer holds a data item.

According to another aspect of the present disclosure, the one or more marked-deleted nodes are followed by one or more non-mark-deleted nodes, and in which each of the one or more of the non-mark-deleted nodes holds a data item.

According to yet another aspect of the present disclosure, a compare and swap operation is performed to ensure only one of the plurality of producer threads is allowed to append its respective node to the last node of the enqueued at least one node.

According to another aspect of the present disclosure, the delete flag indicator field is configured to include either a value indicating a false flag or a value indicating a true flag.

According to a further aspect of the present disclosure, the next node pointer field is configured to either include a null or default value or a non-null address of a first subsequent node in the lock-free self-service queue.

According to yet another aspect of the present disclosure, the lock-free self-service queue includes at least a head hint and a tail hint.

According to a further aspect of the present disclosure, the head hint either points at a node before a logical head node or points at the logical head node itself.

According to another aspect of the present disclosure, the tail hint either points at a node preceding a physical tail node or points at the physical tail node itself.

According to a further aspect of the present disclosure, when a producer thread appends a node to an empty lock-free self-service queue, it will transform into the temporary consumer thread to process the appended node. Upon completion, it will logically dequeue the data item included in the appended node by setting the delete flag indicator in the node. Physical removal of logically deleted nodes may be done at a later time without affecting the correctness of the queue.

According to a further aspect of the present disclosure, enqueuing and dequeuing operations with respect to the lock-free self-service queue are contemporaneously executed.

According to a further aspect of the present disclosure, a value of the delete flag indicator field is modified to reflect a delete status while the next node pointer field remains same to retain a default value when a respective node in the lock-free self-service queue is a last linked node in the lock-free self-service queue.

According to a further aspect of the present disclosure, both the head hint and the tail hint initially point at a same node when the lock-free self-service queue is empty. After subsequent append and remove operations, the queue is empty whenever the chain of nodes, starting from the node pointed at by head hint, and following the next node pointers of each subsequent node until the physical end, are all mark-deleted.

According to a further aspect of the present disclosure, the lock-free self-service queue is absent of a dedicated consumer thread to dequeue the lock-free self-service queue.

According to another aspect of the present disclosure, when the temporary consumer thread dequeues a predetermined number of nodes from the lock-free self-service queue, or when there are no more nodes, the temporary consumer thread transforms back to a producer thread.

According to another aspect of the present disclosure, when the temporary consumer thread dequeues the lock-free self-service queue, the temporary consumer thread transforms back to a producer thread.

According to another aspect of the present disclosure, the appended node becomes a new current last node in the lock-free self-service queue.

According to another aspect of the present disclosure, when the value of the delete flag indicator field is modified to reflect the value indicating the true flag, corresponding node is logically removed from the lock-free self-service node while remaining physically linked with other nodes of the plurality of nodes to become a new head node, as the self-service queue is first-in-first-out.

According to another aspect of the present disclosure, a system for providing a lock-free self-service queue is disclosed. The system includes at least one processor, and at least one memory. The at least one processor is configured to perform: performing, using a processor and a memory: enqueuing at least one node in the lock-free self-service queue, in which the plurality of nodes are linked, in which at least one of the plurality of nodes is configured to hold a data item or remain empty, and in which each of the plurality of nodes includes at least a next node pointer field, a delete flag indicator field and a data item field; competing, by a plurality of producer threads, to append their respective nodes to a last node of the enqueued at least one node; allowing only one of the plurality of producer threads to append its respective node to the last node of the queue, in which unsuccessful producer threads either gives up or reattempt to append their nodes to a new last node of the queue; allowing at least one of the plurality of producer threads to temporarily operate as a temporary consumer thread to logically delete at least one non-mark-deleted node among the plurality of nodes, in which the consumer thread and the plurality of producer threads are concurrently executed; and modifying the next node pointer field of the last node of the enqueued at least one node to include an address of the appended node.

According to another aspect of the present disclosure, a non-transitory computer readable storage medium that stores a computer program for providing a lock-free self-service queue is disclosed. The computer program, when executed by a processor, causing a system to perform a process including performing, using a processor and a memory: enqueuing at least one node in the lock-free self-service queue, in which the plurality of nodes are linked, in which at least one of the plurality of nodes is configured to hold a data item or remain empty, and in which each of the plurality of nodes includes at least a next node pointer field, a delete flag indicator field and a data item field; competing, by a plurality of producer threads, to append their respective nodes to a last node of the enqueued at least one node; allowing only one of the plurality of producer threads to append its respective node to the last node of the enqueued at least one node, in which unsuccessful producer threads either gives up or reattempt to append their nodes to a new last node of the queue; allowing at least one of the plurality of producer threads to temporarily operate as a temporary consumer thread to logically delete at least one non-mark-deleted node among the plurality of nodes, in which the consumer thread and the plurality of producer threads are concurrently executed; and modifying the next node pointer field of the last node of the enqueued at least one node to include an address of the appended node.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 9A-9B illustrate a second intermediate state of a node in a node-based lock-free self-service queue in accordance with an exemplary embodiment.

DETAILED DESCRIPTION

Figure 1:
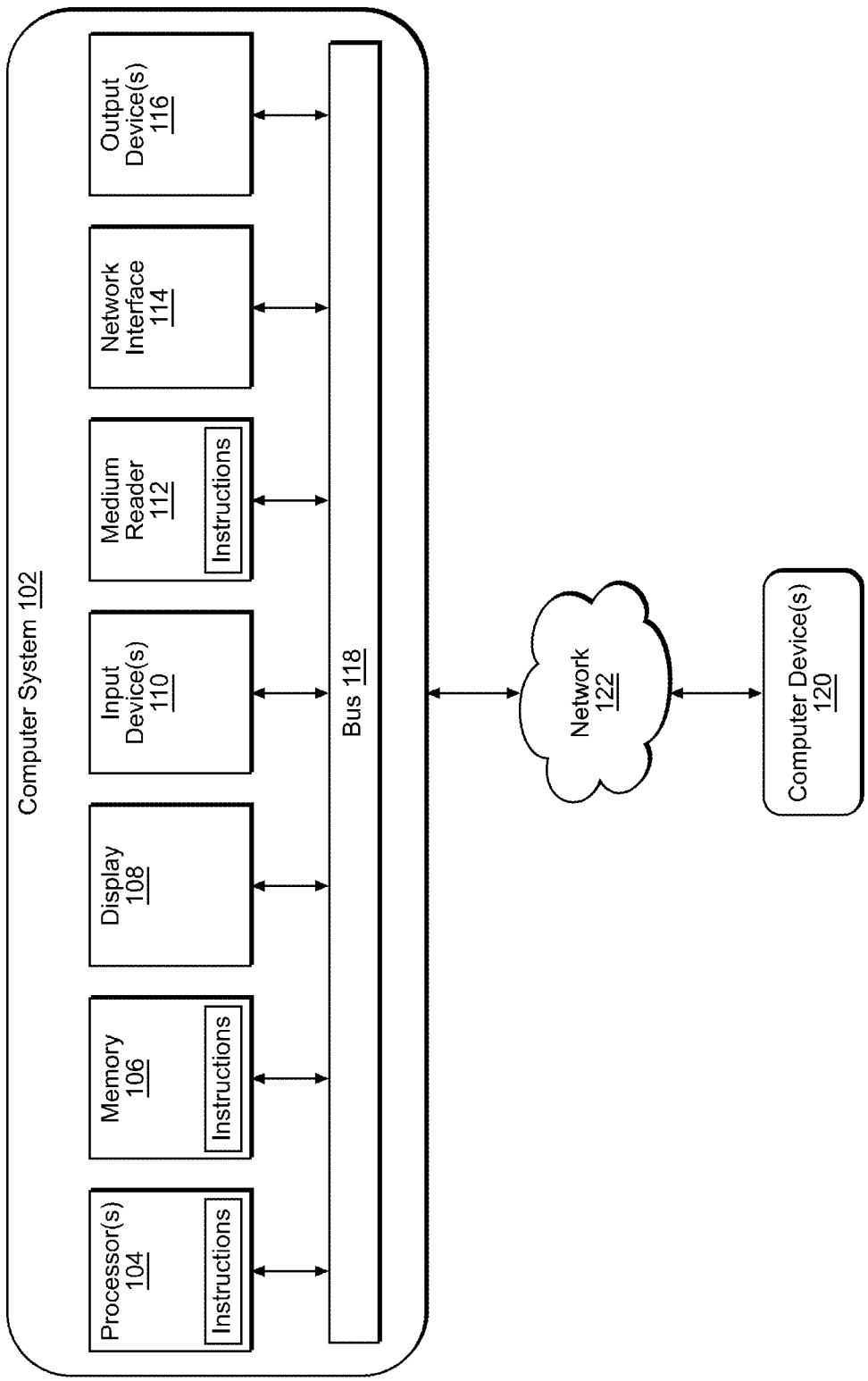
FIG. 1 illustrates a computer system for implementing a lock-free service queue in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a lock-free service queue in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
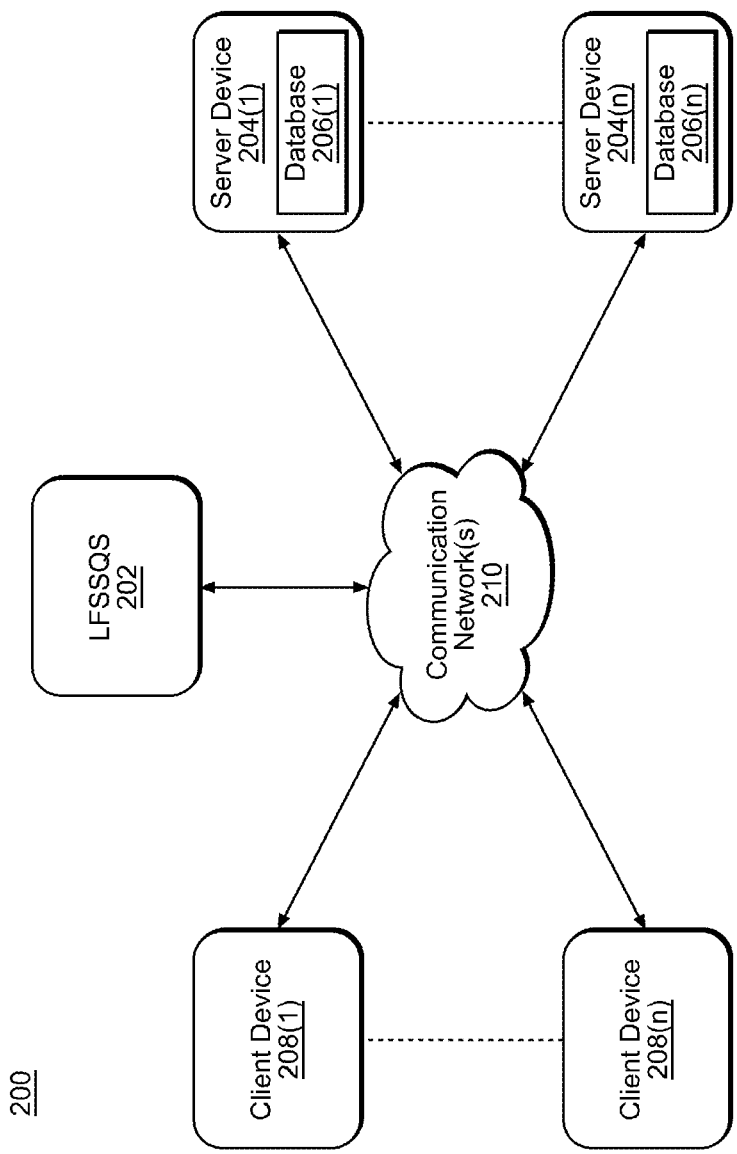
FIG. 2 illustrates an exemplary diagram of a network environment with a lock-free self-service queue (LFSSQ) system in accordance with an exemplary embodiment.

FIG. 2 illustrates an exemplary diagram of a network environment with a lock-free self-service queue system (LFSSQS) in accordance with an exemplary embodiment.

A lock-free self-service queue system (LFSSQS) 202 may be implemented with one or more computer systems similar to the computer system 102 as described with respect to FIG. 1.

The LFSSQS 202 may store one or more applications that can include executable instructions that, when executed by the LFSSQS 202, cause the LFSSQS 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the LFSSQS 202 itself, may be located in virtual server(s) running in a cloud-based computing environment rather than being tied to one or more specific physical network computing devices. Also, the application(s) may be running in one or more virtual machines (VMs) executing on the LFSSQS 202. Additionally, in one or more embodiments of this technology, virtual machine(s) running on the LFSSQS 202 may be managed or supervised by a hypervisor.

In the network environment 200 of FIG. 2, the LFSSQS 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the LFSSQS 202, such as the network interface 114 of the computer system 102 of FIG. 1, operatively couples and communicates between the LFSSQS 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LFSSQS 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LFSSQS 202 may be a standalone device or integrated with one or more other devices or apparatuses, such as one or more of the server devices 204(1)-204(n), for example. In one particular example, the LFSSQS 202 may be hosted by one of the server devices 204(1)-204(n), and other arrangements are also possible. Moreover, one or more of the devices of the LFSSQS 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LFSSQS 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the LFSSQS 202 that may efficiently provide a platform for implementing a cloud native LFSSQS module, but the disclosure is not limited thereto.

The client devices 208(1)-208(n) may run interface applications, such as standard web browsers or standalone client applications, which may provide an interface to communicate with the LFSSQS 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LFSSQS 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LFSSQS 202, the server devices 204(1)-204(n), or the client devices 208(1)-208(n), for example, may be configured to operate as virtual instances on the same physical machine. For example, one or more of the LFSSQS 202, the server devices 204(1)-204(n), or the client devices 208(1)-208(n) may operate on the same physical device rather than as separate devices communicating through communication network(s) 210. Additionally, there may be more or fewer LFSSQS s 202, server devices 204(1)-204(n), or client devices 208(1)-208(n) than illustrated in FIG. 2. According to exemplary embodiments, the LFSSQS 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
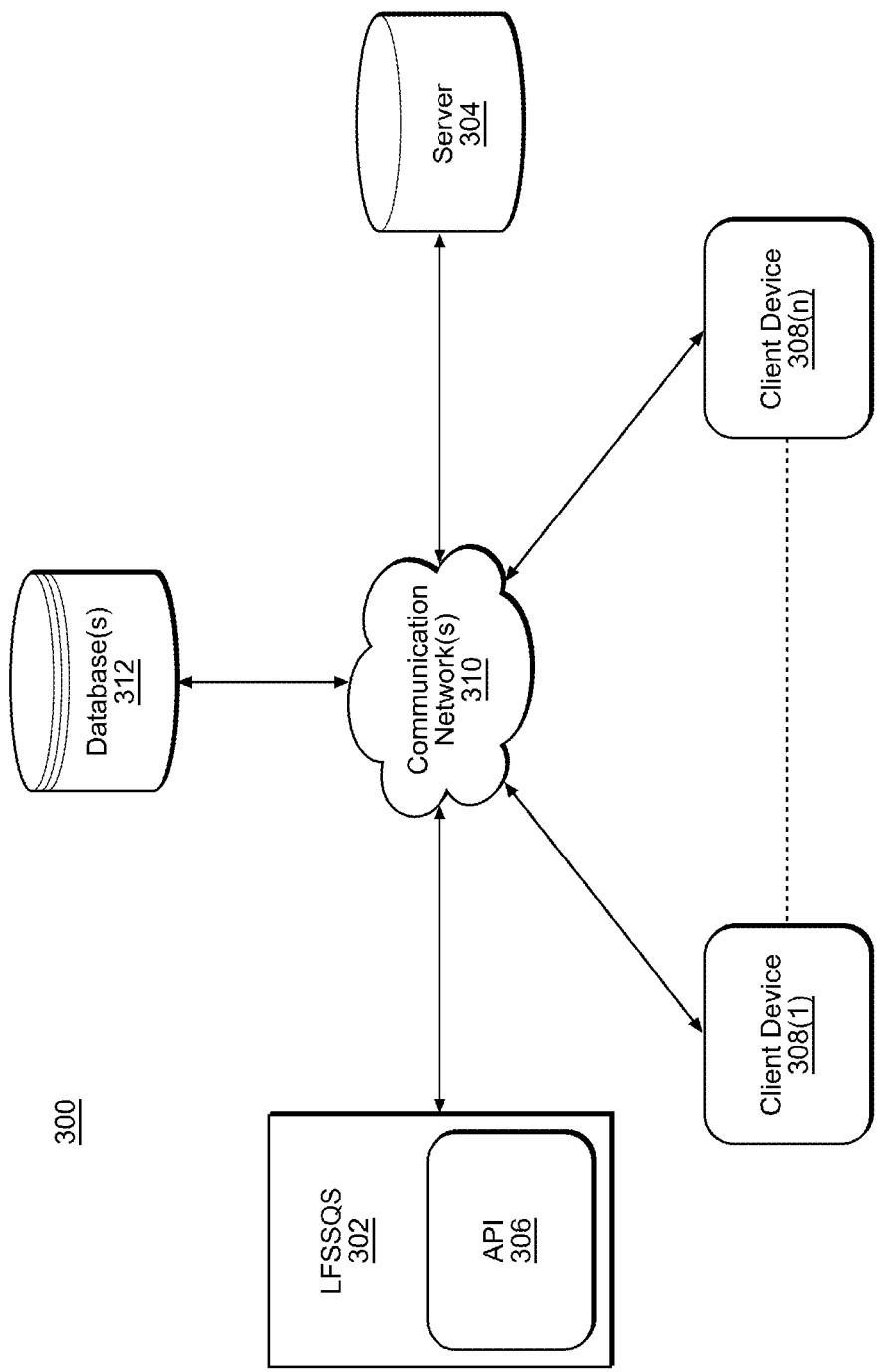
FIG. 3 illustrates a system diagram for implementing a LFSSQ system in accordance with an exemplary embodiment.

FIG. 3 illustrates a system diagram for implementing a LFSSQ system in accordance with an exemplary embodiment.

As illustrated in FIG. 3, the system 300 may include a site reliability engineering leaderboard system 302 within which a group of API modules 306 is embedded, a server 304, a database(s) 312, a plurality of client devices 308(1) . . . 308(n), and a communication network 310.

According to exemplary embodiments, the LFSSQS 302 including the API modules 306 may be connected to the server 304, and the database(s) 312 via the communication network 310. Although there is only one database has been illustrated, the disclosure is not limited thereto. Any number of databases may be utilized. The LFSSQS 302 may also be connected to the plurality of client devices 308(1) . . . 308(n) via the communication network 310, but the disclosure is not limited thereto.

According to exemplary embodiment, the LFSSQS 302 is described and shown in FIG. 3 as including the API modules 306, although it may include other rules, policies, modules, databases, or applications, for example. According to exemplary embodiments, the database(s) 312 may be embedded within the LFSSQS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable LFSSQS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the LFSSQS 302. In this regard, the plurality of client devices 308(1) . . . 308(n) may be "clients" of the LFSSQS 302 and are described herein as such. Nevertheless, it is to be known and understood that the plurality of client devices 308(1) . . . 308(n) need not necessarily be "clients" of the LFSSQS 302, or any entity described in association therewith herein. Any additional or alternative relationship may exist between either or both of the plurality of client devices 308(1) . . . 308(n) and the LFSSQS 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the LFSSQS 302 via broadband or cellular communication. Of course, these embodiments are merely exemplary and are not limiting or exhaustive.

The client devices 308(1)-308(n) may be the same or similar to any one of the client devices 208(1)-208(n) as described with respect to FIG. 2, including any features or combination of features described with respect thereto. The LFSSQS 302 may be the same or similar to the LFSSQS 202 as described with respect to FIG. 2, including any features or combination of features described with respect thereto.

Figure 4:
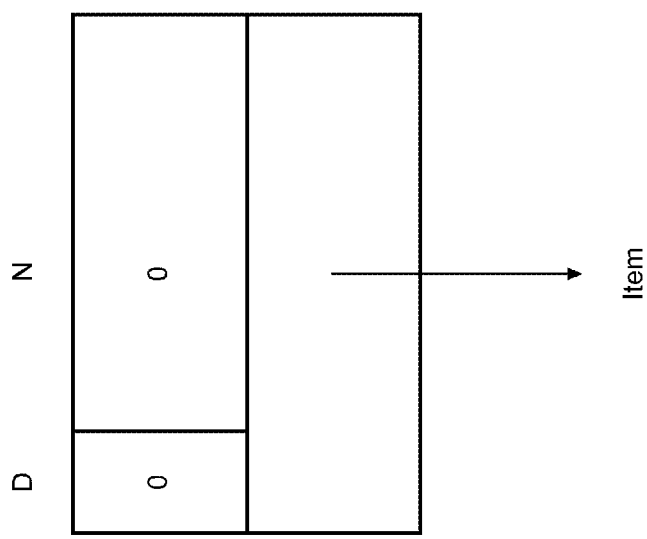
FIG. 4 illustrates an exemplary node utilized in a lock-free self-service queue in accordance with an exemplary embodiment.

FIG. 4 illustrates an exemplary node utilized in a lock-free self-service queue in accordance with an exemplary embodiment.

According to exemplary aspects, a lock-free self-service queue may be formed of a singly linked list of various nodes, in which one or more of such nodes includes an enqueued item. Each of the nodes forming the singled linked list holds atomic state fields, such as a delete flag indicator field and a next node pointer field. In an example, the delete flag indicator may indicate whether a data item held in the respective node has been (mark-) deleted or not. A node must have been (mark-) deleted (i.e. logically deleted), before it may be physically removed from the queue. (Mark-) deleted nodes at the front of the queue may only be physically removed when they are no longer reachable from head_hint either directly or indirectly. There must be at least one (mark-) deleted node in the queue reachable from head hint. The next node pointer may provide a default value to indicate that a subsequent node is not appended to the respective node. In an example, the default value may reflect a null, 0, or any other value indicating that the respective node is presently the last linked node in the lock-free self-service queue. Once another node is appended to such a node, the next node pointer field may reflect an address to the appended or subsequent node.

As illustrated in FIG. 4, each node may include fields indicating at least a delete flag indicator D and a next node pointer N. Further, each node may store or enqueue a data item. Each node is 8-byte aligned, so its address will always have zeros in its 3 least significant bits. The space may be repurposed for one of those 3 least significant bits to store the is_deleted flag. The rest of the 8-byte field is used to store the next pointer N. Although an 8-byte field is described for the node and 1 of the 3 least significant bits were indicated as storing value of is_deleted flag, aspects of the present disclosure are not limited there to such that a different numbered byte field or bits may be utilized.

One of the least significant 3 bits may be designated to store a value of the delete flag indicator D, which may have a value of true (or 1) or false (or 0). If the flag is true, then the respective node may be a mark-deleted (i.e. logically deleted) node, indicating that its stored or enqueued data item has been deleted. If the flag is false or 0, the respective node may be a non-deleted or a non-mark-deleted node.

Moreover, the next node pointer N may be used to store an address to a following node. In an example, the next node pointer N may store an address to the node that is directly subsequent to the current node. If the next node pointer N indicates a value of 0, the respective node is the last physical node in the lock-free self-service queue.

According to exemplary aspects, a producer node may be enqueue with a data item, in which the delete flag indicator D will have a false or 0 as its default value. The producer node may have a default value of null or 0 for the next node pointer N, which may be modified to reflect an address of a following node when a new node is appended to the present node. However, if the present node is the last node in a linked chain of nodes in the lock-free self-service queue, the default value may be maintained for the next node pointer N field.

Once the respective node dequeues the data item, the delete flag indicator D will be modified to have a true or 1 as its value to reflect a logical delete status and the respective node will no longer store the respective data item. Value of the next node pointer N may remain the same to point to the following node. Such a dequeued node may be referred to as a mark-deleted node.

Figure 5:
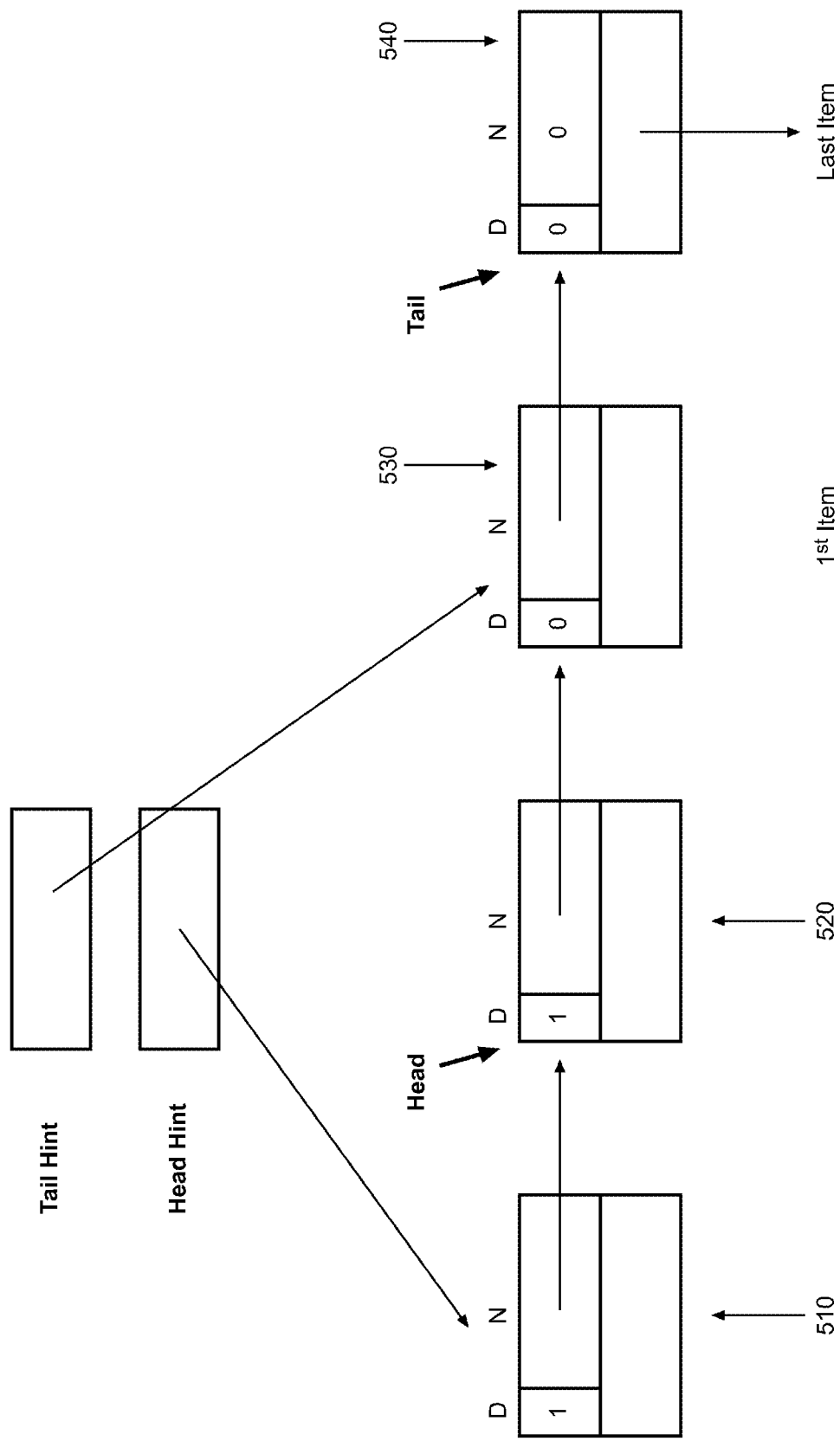
FIG. 5 illustrates a node-based lock-free self-service queue in accordance with an exemplary embodiment.

FIG. 5 illustrates a node-based lock-free self-service queue in accordance with an exemplary embodiment.

According to exemplary aspects of the present disclosure, requirement of having a separate consumer thread may be eliminated in a lock-free self-service model if the queue utilized by both a producer thread and a consumer thread may be enhanced to support operations including: (1) atomically enqueue an item and return whether the queue was empty before the item was enqueued, and (2) atomically dequeue an item from the queue in first-in-first-out (FIFO) order and also return whether the returned item was the last item in the queue. Based on support of these two atomic operations, a producer-consumer queue may be configured as a self-service queue that no longer requires a dedicated consumer thread.

For example, when a producer thread enqueues an item into a self-service queue, the return value will indicate if the queue has been empty. If so, the enqueued item is the first one in the queue, and the producer thread may switch role to become the consumer thread. It will execute the enqueued item, while the item is still in the queue. In the meantime, other concurrent producer threads may enqueue more items into the self-service queue. Once the consumer thread has executed the item, it will perform the dequeue operation to logically delete the node containing the executed item. If the queue has more items (i.e. the deleted item is not the last), then the consumer thread may continue to execute the next item. When done, it will dequeue the executed item, and dequeue, until there are no more items in the self-service queue. However, aspects of the present disclosure are not limited thereto, such that other variations are possible. For example, the consumer thread may execute up to a fixed number of items, and if there are more, defer to another thread to continue execution until the queue is completely drained.

In other words, the producer thread that enqueues the first item is borrowed to assume the role of that of a consuming thread and execute the enqueued item, and any subsequently enqueued items, until there is no more.

The node-based lock-free self-service queue includes a linked list of one or more mark-deleted nodes, which may or may not be followed by one or more non-marked-deleted nodes. In FIG. 5, the linked list may include a first node 510, a second node 520, a third node 530 and a fourth node 540. As illustrated in FIG. 5, the first node 510 and second node 520 have a value of 1 or true for the delete flag indicator D, which may indicate that the first node 510 and second node 520 are mark-deleted nodes. On the other hand, the third node 530 and the fourth node 540 have a value of 0 or false for the delete flag indicator D, which may indicate that the third node 530 and the fourth node 540 are non-mark-deleted or non-deleted nodes still including enqueued data items.

In FIG. 5, the node-based lock-free self-service queue includes a linked list including mark-deleted first node 510 and the second node 520, which may or may not be followed by non-mark-deleted third node 530 and the fourth node 540. The linked nodes of FIG. 5 illustrate that the second node 520 is a head node, which is the last mark-deleted node having the delete flag indicator D value of 1. According to exemplary aspects, a head node may either be the last physical node if the queue is empty (i.e., 0 non-mark-deleted nodes exist), or the next node pointer N may hold the address of the first non-mark-deleted node of the queue. However, aspects of the present disclosure are not limited thereto, such that other values indicating a head node status may be utilized.

The linked nodes of FIG. 5 also include a tail node, which is the last physical node in the queue. According to exemplary aspects, a tail node may have a value of 0 for the next node pointer N. However, aspects of the present disclosure are not limited thereto, such that other values indicating a tail node status may be utilized.

The mark-deleted node may indicate a value of 1 for the delete flag indicator D. The value of 1 or true may indicate that the data item in the respective node has been deleted. In contrast, the delete flag indicator D for the non-mark-deleted nodes may indicate a value of 0 or false, which indicates that the data item included in the respective node has not yet been deleted.

The next node pointer N may be used to store an address to the following node. In an example, the next node pointer N may store an address to the node that is directly subsequent to the current node. More specifically, the next node pointer N of the first node 510 may store an address to the second node 520. Similarly, the next node pointer N of the second node 520 may store an address to the third node 530, and the next node pointer N of the third node 530 may store an address to the fourth node 540. However, the next node pointer N of the fourth node 540 may store a value of 0 as the fourth node is the tail node.

According to exemplary aspects, if the last physical node is mark-deleted, the self-service queue is indicated as being empty. In an example, if the queue is empty, i.e., no non-mark-deleted nodes, then no physical deletion is possible. Only multiple producers need to contend or compete on the atomic state field, namely the next node pointer field, in the last mark-deleted node (i.e., header) to attempt to perform an atomic Compare-And-Swap (CAS) from a value of the (1,0) to a value of (1,X), where X corresponds to an address of the appending node corresponding to the winning producer thread.

On the other hand, if the queue has exactly 1 non-mark-deleted node, both enqueueing to the end and dequeuing from the front are possible. Multiple producer and consumer threads may contend on the atomic state fields (both the next node pointer field and the delete flag indicator field) of the first and only non-mark-deleted node. A producer thread will attempt to CAS from (0,0) to (0,X), in which the first value indicates a value of the delete flag indicator that remain 0, and the second value points to a value of the next node pointer field that changes from 0 to X, in which X corresponds to an address of the appending node corresponding to the winning producer thread. A consumer thread, which may perform operation concurrently with or in parallel with a producer thread may attempt to CAS from (0,0) to (1,0). Accordingly, in the lock-free self-service queue, concurrent processing of the consumer thread and the producer thread may be possible, which increases processing capability of a processor of the self-service queue.

Lastly, if the queue has more than 1 non-mark-deleted node, producers or producer threads will contend on the tail (i.e., last non-mark-deleted node), to attempt to CAS from (0,0) to (0,X). The consumers or consumer threads may contend on the head (i.e., first non-mark-deleted node), to attempt to CAS from (0,X) to (1,X).

Moreover, the self-service queue may include a head hint and/or a tail hint. According to exemplary aspects, the tail hint field may point at a node that is close to the physical end of the self-service queue, such as a node that is second to last physical node in the lock-free self-service queue. The tail hint may serve as a starting point to look for the actual physical end for inserting or appending a new node to singly linked nodes in the lock-free self-service queue. On the other hand, the head hint field may point at a node that is close to the last mark-deleted node, such as a first non-mark-deleted node that is adjacent to the last mark-deleted node in the lock-free self-service queue. The head hint may serve as a starting point to look for the first non-mark-deleted node. If there is none, the search may reach the end of the queue.

With respect to FIG. 5, the head hint may point at the first node 510 before the second node (head node) 520. However, aspects of the present disclosure are not limited thereto, such that the head hint may point at the second node (head node) 520 itself. The tail hint, on the other hand, may point at the third node 530 before the fourth node (tail node) 540 (e.g., a node right before the tail node). However, aspects of the present disclosure are not limited thereto, such that the tail hint may point at that fourth node (tail node) 540 itself. In an example, the head hint and/or the tail hint may be used to expedite a search for the head node or the tail node.

Figure 6:
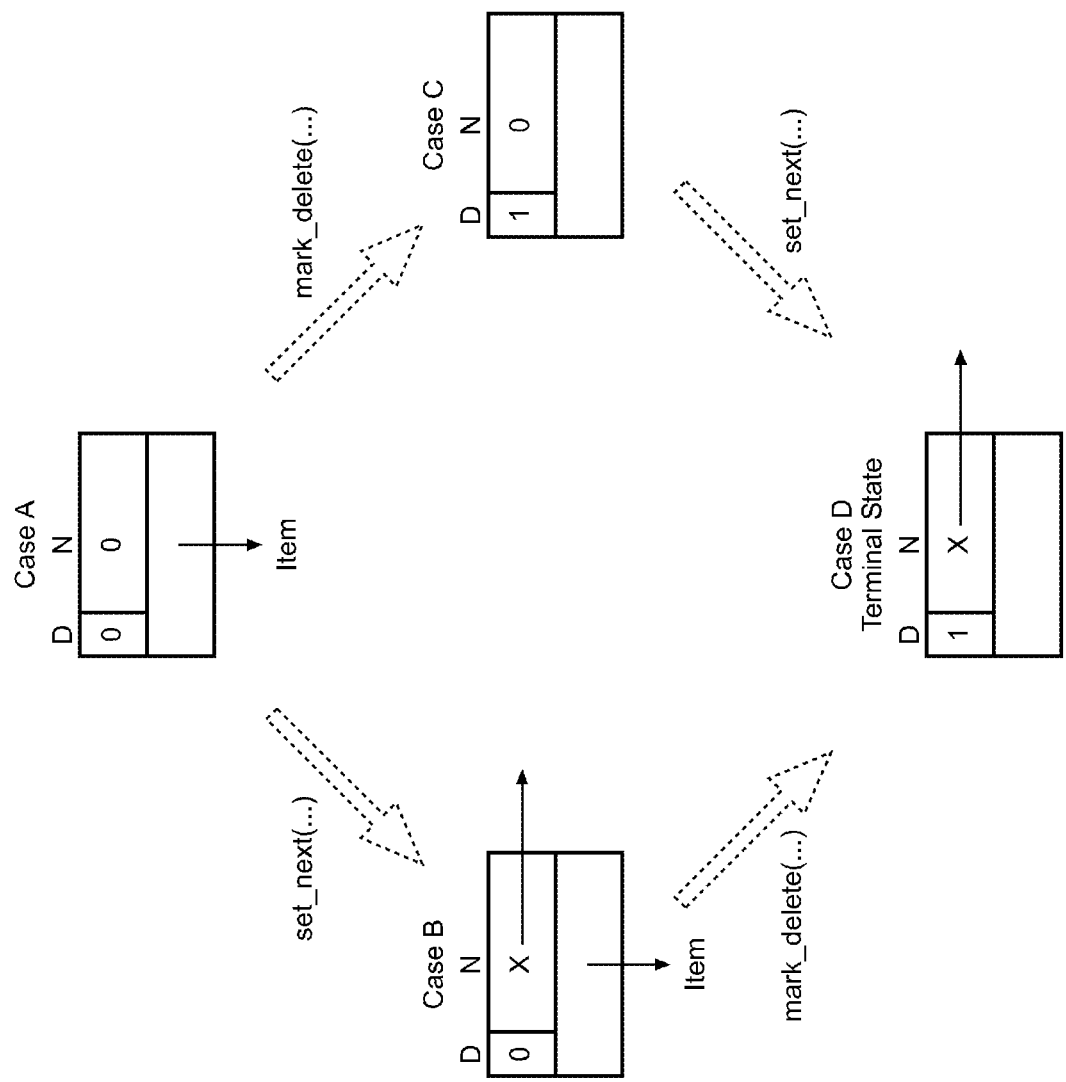
FIG. 6 illustrates a life cycle of a node in a node-based lock-free self-service queue in accordance with an exemplary embodiment.

FIG. 6 illustrates a life cycle of a node in a node-based lock-free self-service queue in accordance with an exemplary embodiment.

As exemplarily illustrated in FIG. 6, a life cycle of a node in a lock-free service queue includes at least four cases. An initial state (case A) may transition to an intermediate status (either of case B or case C) before ending at a terminal state (case D).

As illustrated in the node of case A, both the delete flag indicator D and the next node pointer N may have a value of 0 or false as the node has yet to be deleted. Initial state or case A may indicate that the last physical node in the linked chain of nodes is a non-mark-deleted node. From the initial state, either the next node pointer N may be modified to transition to case B or the delete flag indicator D may be modified to transition to case C.

Intermediate state of case B may indicate a current node is non-mark-deleted but it's not the last one, such that there is a non-mark-deleted node after the current node. As illustrated in FIG. 6, a value of the next node pointer N may be modified from a value of 0 or null to a value of X, in which X may indicate a network address of a subsequent node in the linked chain of nodes.

Intermediate state of case C may indicate the current node is physically last node in the self-service queue and is deleted. In other words, this may be a header node of an empty queue. As illustrated in FIG. 6, a value of the delete flag indicator D may be modified from a value of 0 or false to a value of 1 or true.

Lastly, the terminal state or case D indicates that a node is at a final state where no further change is possible. For example, the node in case B may be further modified to modify a value of the delete flag indicator D from a value of 0 or false to a value of 1 or true. Alternatively, the node in case C may be further processed to modify a value of the next node pointer N from a value of 0 or null to a value of X, in which X may indicate a network address of a subsequent node in the linked chain of nodes. Accordingly, the node in the terminal state or case D may have a value of 1 or true for the delete flag indicator D, and a value of X for the next node pointer N. Accordingly, regardless of whether the node transitioned from cases A→B→D or from cases A→C→D, terminal state of the respective node may have the same or similar values. However, if a node is a last linked node in the lock-free self-service queue, the next node pointer N field of the respective node may reflect a default value of 0 or null.

Figure 7A:
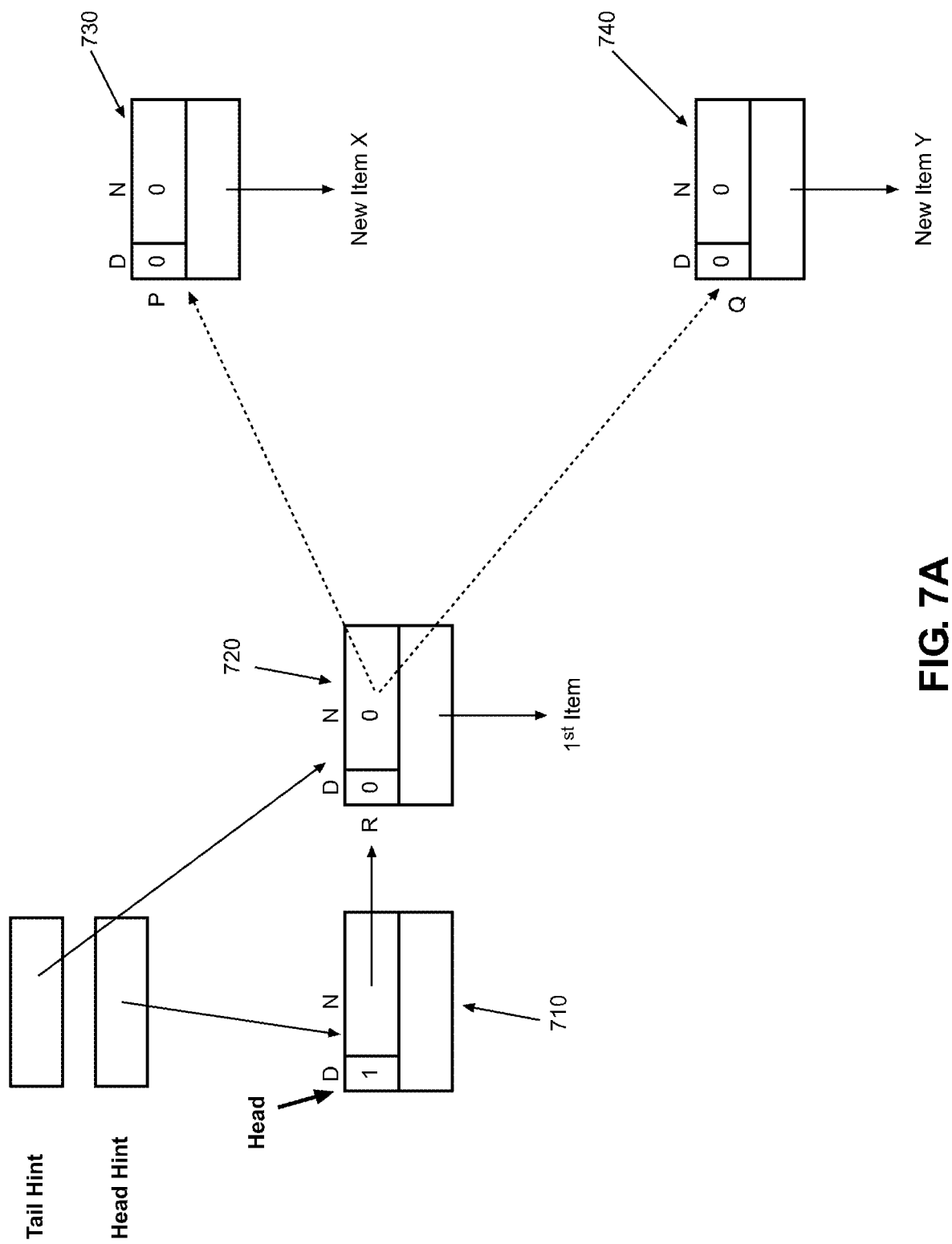
FIGS. 7A-7B illustrate an initial state of a node in a node-based lock-free self-service queue in accordance with an exemplary embodiment.
Figure 7B:
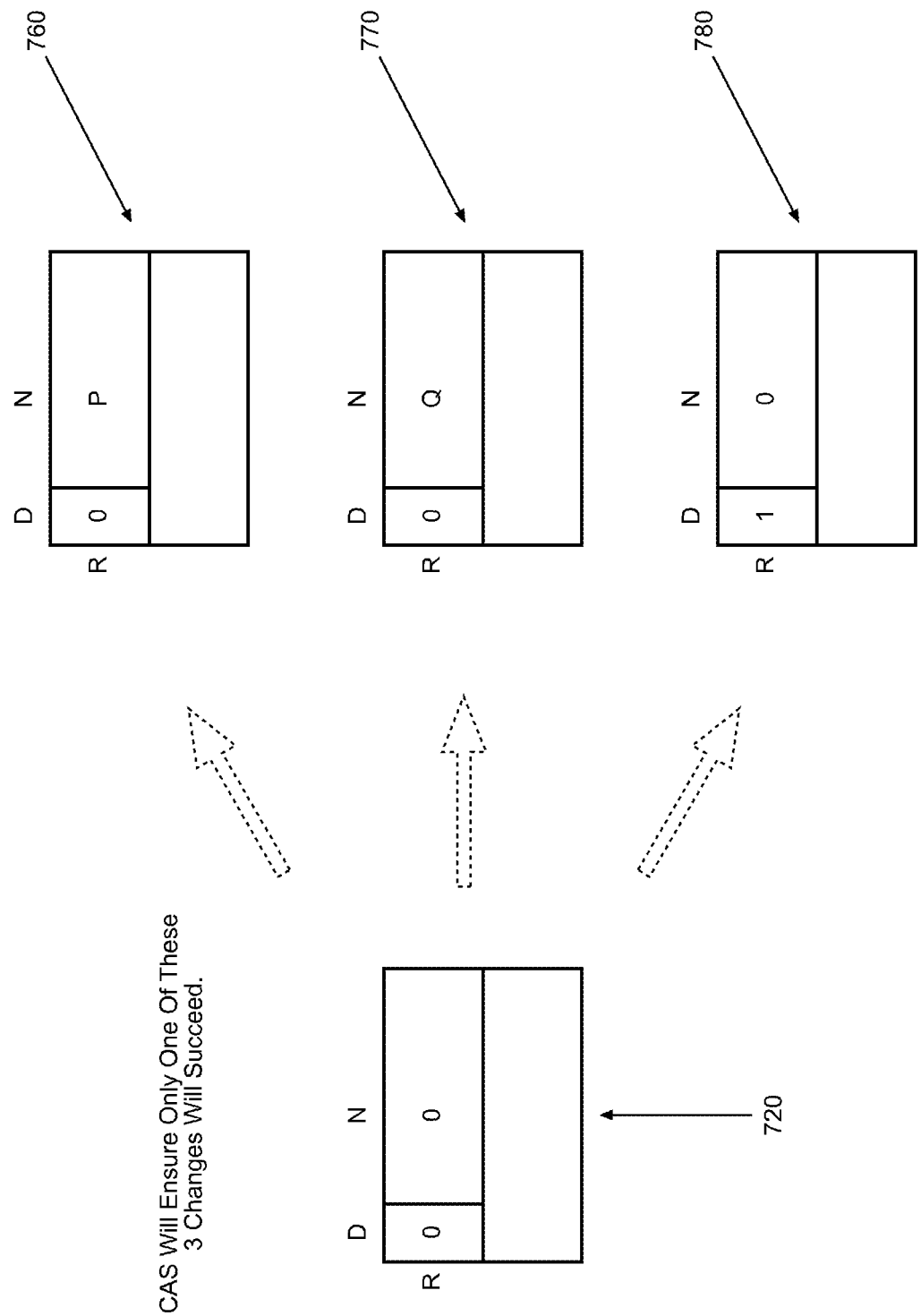

FIGS. 7A-7B illustrate an initial state of a node in a node-based lock-free self-service queue in accordance with an exemplary embodiment.

In the initial state, the node-based lock-free self-service queue of FIG. 7A includes a head node 710 and a tail node 720. Further, two competing threads (a first thread 730 having a first address P and a second thread 740 having a second address Q) may attempt to append its new respective nodes, each including its new respective item, to the tail node 720 having an address R.

The first thread 730 may exemplarily use a compare-and-swap operation (CAS) to change a value for the next node pointer N of the tail node 720 from an initial value of 0 to the first address P, while the second thread 740 may contemporaneously use CAS to change the value for the next node pointer N of the tail node 720 from the initial value of 0 to the second address Q. The initial value of 0 may be a default value provided to a tail node in the node-based lock-free self-service queue.

At the same time, there may be a third thread that attempts to mark-delete the tail node 720, which may be the only enqueued node (i.e., value of delete flag indicator being 0) having in this queue. More specifically, the third thread may use CAS to try to change the value of the delete flag indicator of the tail node 720 from 0 (false) to 1 (true).

If a fourth thread attempts to mark-delete the tail node 720 (e.g., use CAS to change the value of the delete flag indicator of the tail node 720 from 0 (false) to 1 (true)), contemporaneously with the third thread, then the CAS will select one winner among the third thread and the fourth thread.

Accordingly, even if multiple threads attempt to change a field value of a node, the CAS will ensure that only one thread is allowed to make the change. More specifically, as illustrated in FIG. 7B, the tail node 720 may transition to only one of a first node state 760, a second node state 770 and a third node state 780. The tail node 720 may have an initial delete flag indicator D value of 0, and an initial next node pointer N value of 0. The first node state 760 may have a delete flag indicator D value of 0, and a next node pointer N value of P. The second node state 770 may have a delete flag indicator D value of 0, and a next node pointer N value of Q. The third node state 780 may have a delete flag indicator D value of 1, and a next node pointer N value of 0.

Figure 8A:
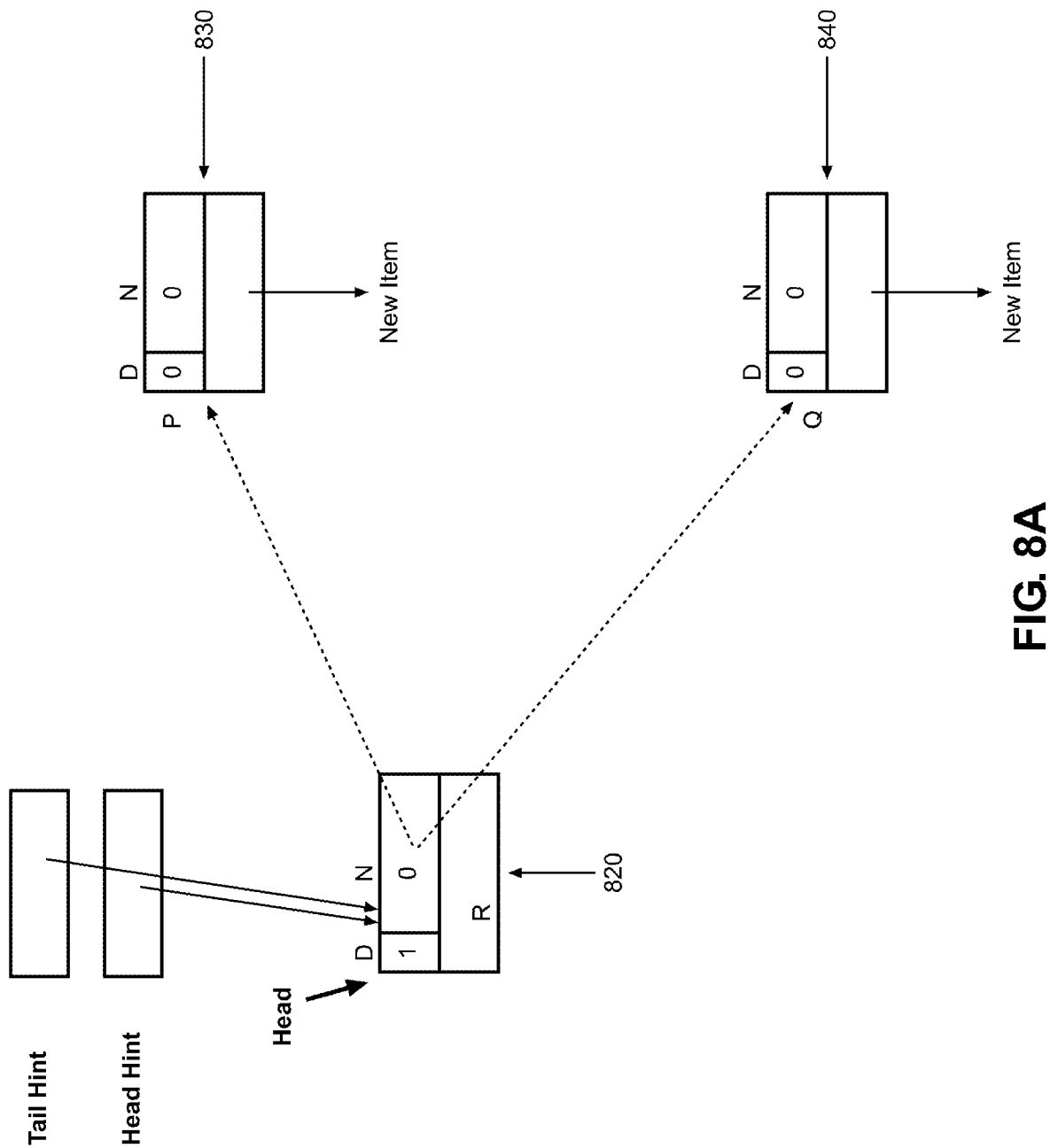
FIGS. 8A-8B illustrate a first intermediate state of a node in a node-based lock-free self-service queue in accordance with an exemplary embodiment.
Figure 8B:
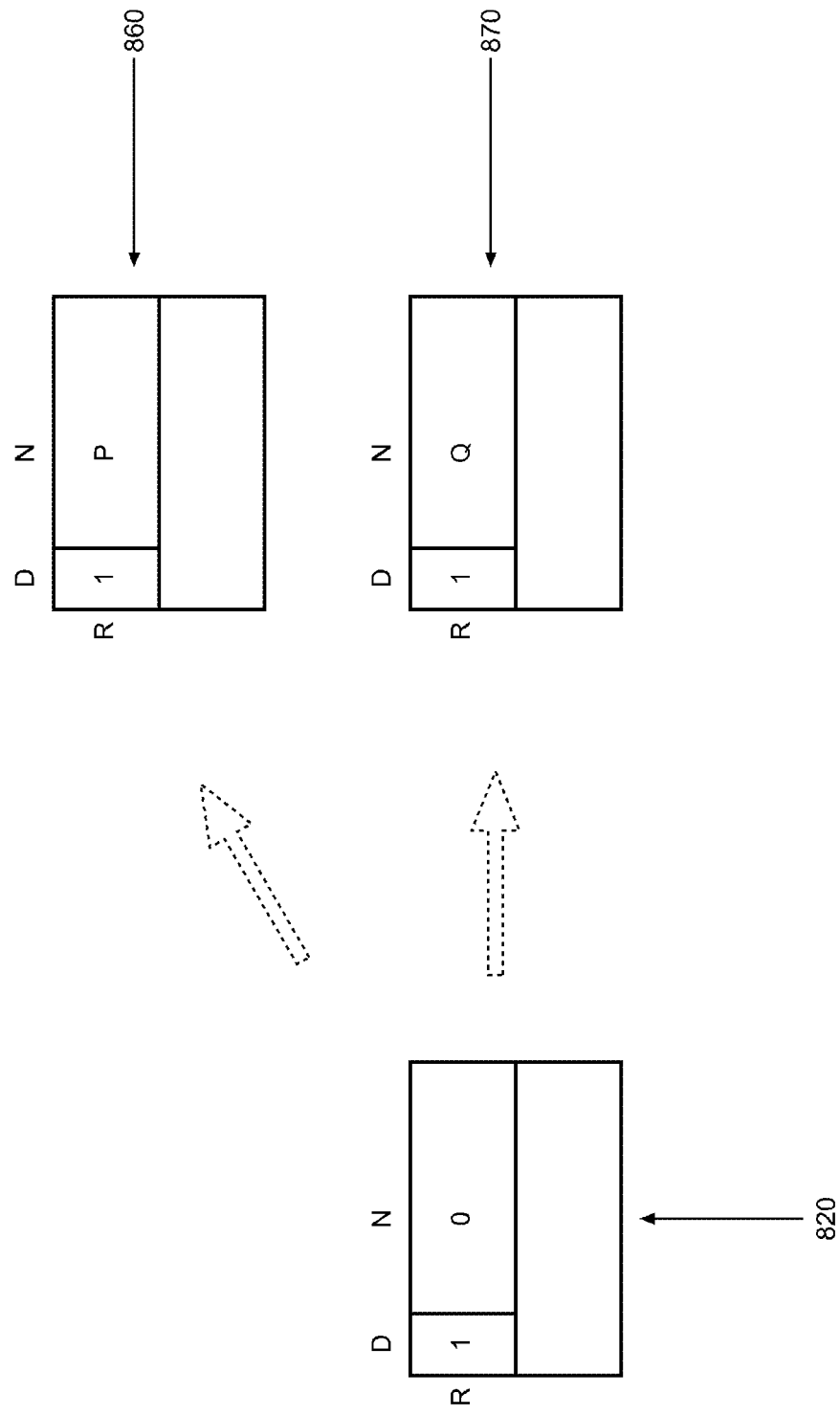

FIGS. 8A-8B illustrate a first intermediate state of a node in a node-based lock-free self-service queue in accordance with an exemplary embodiment.

In the first intermediate state, the node-based lock-free self-service queue of FIG. 8A includes a last logically deleted node 820 having an address R that is to be processed to modify its initial value of the next node pointer N from 0 or null to include either of a first address P of a node 830 or a second address Q of a node 840. More specifically, two competing threads (a first thread for the node 830 having the first address P and a second thread for the node 840 having the second address Q) may attempt to append its new respective nodes, each including its new respective item, to the node 820 having an address R. At least since only one node is present in FIG. 8A, both the tail hint and the head hint may be directed to the node 820.

The first thread for node 830 may exemplarily use a compare-and-swap operation (CAS) to change a value for the next node pointer N of the node 820 from an initial value of 0 to the first address P, while the second thread for node 840 may contemporaneously use CAS to change the value for the next node pointer N of the node 820 from the initial value of 0 to the second address Q.

However, only one thread or operation is allowed to append a new node to the node 820. For example, in FIG. 8, only one of the threads for nodes 830 and 840 may be able to succeed in appending its node to the node 820. CAS will ensure that only one thread will succeed, such that the thread that was unable to append its node will need to either try again.

More specifically, as illustrated in FIG. 8B, upon successful appending of either of node 830 or node 840 to the node 820, the node 820 may be modified to either of a first modified node 860 which will have the address P of node 830 for the next node pointer N field or a second modified node 870 which will have the address Q of node 840 for the next node pointer N field.

Accordingly, upon successfully appending either of node 830 or 840 to transform the node 820 to either to the first modified node 860 or the second modified node 870, respectively, the losing thread that was unable to append its node may either give up its attempt or may reattempt to append its node to either of the first modified node 860 or the second modified node 870.

Figure 9A:
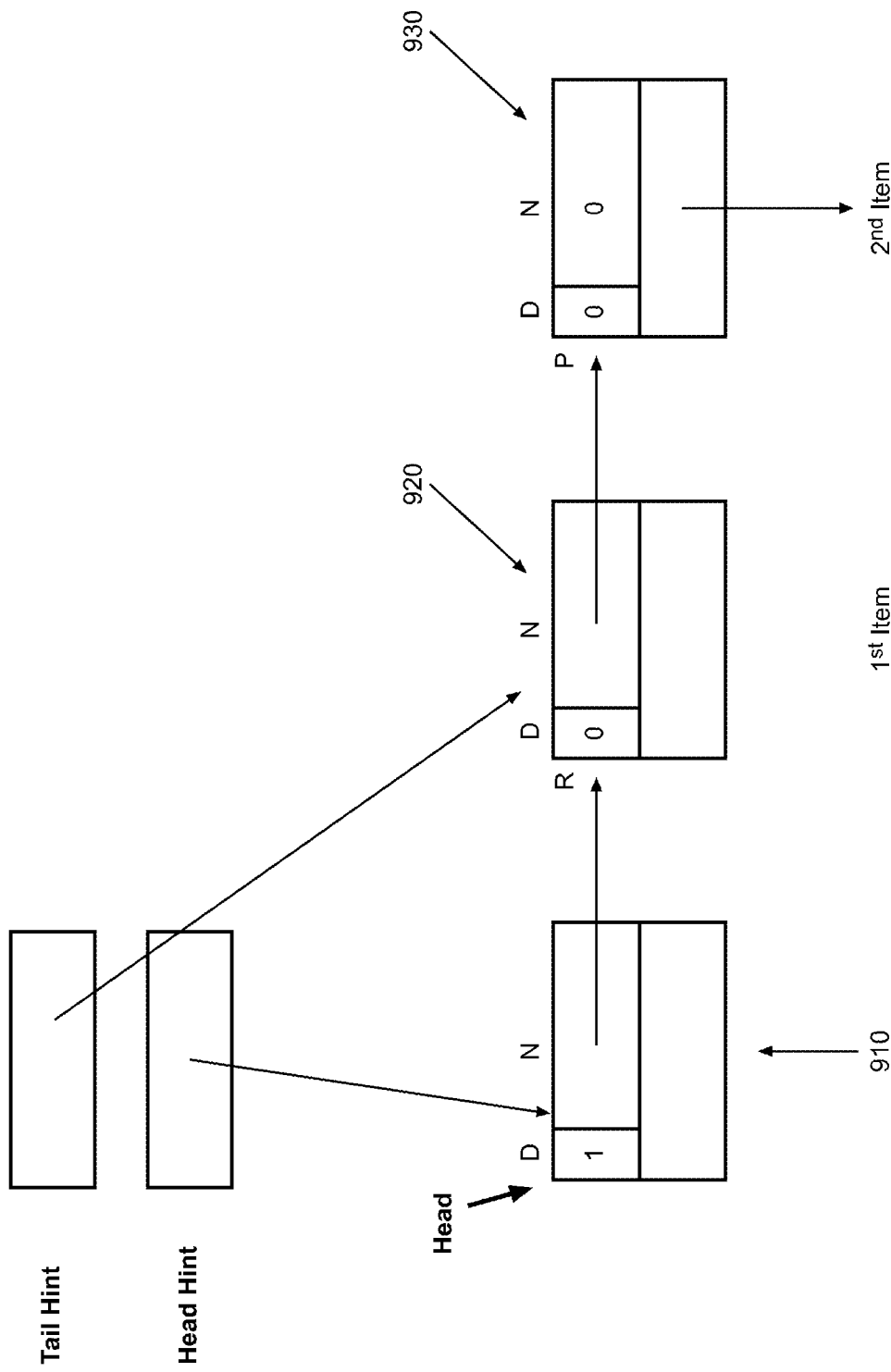

FIGS. 9A-9B illustrate a second intermediate state of a node in a node-based lock-free self-service queue in accordance with an exemplary embodiment.

In the second intermediate state, the node-based lock-free self-service queue of FIG. 9A includes a head node 910 that is followed by a first node 920 having an address R, which is further followed by a second node 930 having an address Q. In FIG. 9A, the second node 930 may be the tail node, which is the last node in the self-service queue. The head hint may point to the head node 910, and the tail hint may point to the first node 920, which is the last node that another node, such as the second node 930, may be appended to.

As illustrated in FIG. 9A, the first node 920 may be a non-mark-deleted node that is not the last node in the self-service queue. In other words, the value in its next node pointer N field may not be null or zero. According to exemplary aspects, depending on the length of the self-service queue, the first node 920 may or may not be the first non-mark-deleted node. Further, no thread may be able to append to the first node 920 because only the last node in the queue (i.e., second node 930) may be appended to the first node 920.

In this exemplary embodiment for case C or the second intermediate state, one or more threads may attempt to mark-delete the first node 920, thereby logically removing the respective node from the self-service queue, even though the node may still be physically linked. Once the first node 920 is logically removed from the self-service queue, the value for its delete flag indicator D field may be changed from a value of 0 or false to a value of 1 or true to provide a modified first node 960 as illustrated in FIG. 9B. The value for the next node pointer N field will remain the same. Once the first node 920 is logically removed from the self-service queue, then the first node 920 may become the new header node.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a lock-free self-service queue, the method comprising:
    performing, using a processor and a memory:
        enqueuing, among a plurality of nodes, at least one node in the lock-free self-service queue,
            wherein the plurality of nodes are linked,
            wherein at least one of the plurality of nodes is configured to hold a data item or remain empty, and
            wherein each of the plurality of nodes includes at least a next node pointer field, a delete flag indicator field and a data item field;
        competing, by a plurality of producer threads, to append their respective nodes to a last node of the enqueued at least one node;
        allowing, by the processor, only a first thread of the plurality of producer threads to append its respective node to the last node of the enqueued at least one node, wherein unsuccessful producer threads either give up or reattempt to append their nodes to a new last node of the queue;
        allowing, by the processor, at least one of the plurality of producer threads to temporarily operate as a temporary consumer thread to logically delete at least one non-mark-deleted node among the plurality of nodes, wherein the at least one temporary consumer thread and others of the plurality of producer threads are concurrently executed; and
        modifying the next node pointer field of the last node of the enqueued at least one node to include an address of the appended node of the first thread,
        wherein, when the appended node of the first thread is a last non-mark-deleted node in the lock-free self-service queue:
            one or more of the plurality of producer threads will transform into one or more temporary consumer threads; and
            one of the one or more temporary consumer threads dequeues a data item included in the appended node of the first thread and modifies a value of a delete flag indicator field of the appended node of the first thread to reflect a delete status.

2. The method according to claim 1, wherein the at least one enqueued node included in the lock-free self-service queue comprises one or more mark-deleted nodes, and wherein each of the one or more mark-deleted nodes no longer holds a data item.

3. The method according to claim 2, wherein the one or more mark-deleted nodes are followed by one or more non-mark-deleted nodes, and wherein each of the one or more non-mark-deleted nodes holds a data item.

4. The method according to claim 1, wherein a compare and swap operation is performed to ensure only one of the plurality of producer threads is allowed to append its respective node to the last node of the enqueued at least one node.

5. The method according to claim 1, wherein the delete flag indicator field of each of the plurality of nodes is configured to include either a value indicating a false flag or a value indicating a true flag.

6. The method according to claim 1, wherein the next node pointer field of each of the plurality of nodes is configured to either include a null or default value or an address of a first subsequent non-mark-deleted node in the lock-free self-service queue.

7. The method according to claim 1, wherein the lock-free self-service queue includes at least a head hint and a tail hint.

8. The method according to claim 7, wherein the head hint either points at a node before a physical head node or points at the physical head node itself.

9. The method according to claim 7, wherein the tail hint either points at a node immediately preceding a physical tail node or points at the physical tail node itself.

10. The method according to claim 7, wherein both the head hint and the tail hint point at a same node when the lock-free self-service queue is empty.

11. The method according to claim 1, wherein enqueuing and dequeuing operations with respect to the lock-free self-service queue are contemporaneously executed.

12. The method according to claim 1, wherein a value of a delete flag indicator field of a target node among the plurality of nodes is modified to reflect a delete status while a next node pointer field of the target node remains unchanged to retain a default value when the target node in the lock-free self-service queue is a last linked node in the lock-free self-service queue.

13. The method according to claim 1, wherein the lock-free self-service queue is without a dedicated consumer thread to dequeue the lock-free self-service queue.

14. The method according to claim 1, wherein, when a given temporary consumer thread dequeues a predetermined number of nodes from the lock-free self-service queue, the given temporary consumer thread transforms back to a producer thread.

15. The method according to claim 1, wherein, when a given temporary consumer thread dequeues the lock-free self-service queue, the given temporary consumer thread transforms back to a producer thread.

16. The method according to claim 1, wherein the appended node of the first thread becomes a new current last node in the lock-free self-service queue.

17. The method according to claim 1, wherein, when a value of a delete flag indicator field of a target node among the plurality of nodes is modified to reflect a value indicating a true flag, the target node is logically removed from the lock-free self-service queue while remaining physically linked with other nodes of the plurality of nodes to become a new head node.

18. A system for providing a lock-free self-service queue, the system comprising:
at least one processor; and
at least one memory,
wherein the at least one processor performs:
enqueuing, among a plurality of nodes, at least one node in the lock-free self-service queue,
wherein the plurality of nodes are linked,
wherein at least one of the plurality of nodes is configured to hold a data item or remain empty, and
wherein each of the plurality of nodes includes at least a next node pointer field, a delete flag indicator field and a data item field;
competing, by a plurality of producer threads, to append their respective nodes to a last node of the enqueued at least one node;
allowing only a first thread of the plurality of producer threads to append its respective node to the last node of the enqueued at least one node, wherein unsuccessful producer threads either give up or reattempt to append their nodes to a new last node of the queue;
allowing at least one of the plurality of producer threads to temporarily operate as a temporary consumer thread to logically delete at least one non-mark-deleted node among the plurality of nodes, wherein the at least one temporary consumer thread and others of the plurality of producer threads are concurrently executed; and
modifying the next node pointer field of the last node of the enqueued at least one node to include an address of the appended node of the first thread,
wherein, when the appended node of the first thread is a last non-mark-deleted node in the lock-free self-service queue:
one or more of the plurality of producer threads will transform into one or more temporary consumer threads; and
one of the one or more temporary consumer threads dequeues a data item included in the appended node of the first thread and modifies a value of a delete flag indicator field of the appended node of the first thread to reflect a delete status.

19. A non-transitory computer readable storage medium that stores a computer program for providing a lock-free self-service queue, the computer program, when executed by a processor, causing a system to perform a process comprising:
enqueuing, among a plurality of nodes, at least one node in the lock-free self-service queue,
wherein the plurality of nodes are linked,
wherein at least one of the plurality of nodes is configured to hold a data item or remain empty, and
wherein each of the plurality of nodes includes at least a next node pointer field, a delete flag indicator field and a data item field;
competing, by a plurality of producer threads, to append their respective nodes to a last node of the enqueued at least one node;
allowing only a first thread of the plurality of producer threads to append its respective node to the last node of the enqueued at least one node, wherein unsuccessful producer threads either give up or reattempt to append their nodes to a new last node of the queue;
allowing at least one of the plurality of producer threads to temporarily operate as a temporary consumer thread to logically delete at least one non-mark-deleted node among the plurality of nodes, wherein the at least one temporary consumer thread and others of the plurality of producer threads are concurrently executed; and
modifying the next node pointer field of the last node of the enqueued at least one node to include an address of the appended node of the first thread,
wherein, when the appended node of the first thread is a last non-mark-deleted node in the lock-free self-service queue:
one or more of the plurality of producer threads will transform into one or more temporary consumer threads; and
one of the one or more temporary consumer threads dequeues a data item included in the appended node of the first thread and modifies a value of a delete flag indicator field of the appended node of the first thread to reflect a delete status.

* * * * *